April 22, 1969  L. C. STANNARD  3,439,415
TRANSITIONAL COUPLING WAVEGUIDES
Filed Nov. 28, 1966

INVENTOR
Leslie Charles Stannard
BY
Baldwin Wight Diller & Brown
ATTORNEYS

United States Patent Office 3,439,415
Patented Apr. 22, 1969

3,439,415
TRANSITIONAL COUPLING WAVEGUIDES
Leslie Charles Stannard, Essex, England, assignor to The Marconi Company Limited, London, England, a British company
Filed Nov. 28, 1966, Ser. No. 597,262
Claims priority, application Great Britain, Jan. 4, 1967, 234/66
Int. Cl. H01p 11/00, 1/00; H01q 13/00
U.S. Cl. 29—600                                   2 Claims

ABSTRACT OF THE DISCLOSURE

A transitional coupling waveguide is produced by cutting away two opposite sidewalls of a length of waveguide and bending the unremoved sidewalls to form a smoothly tapered structure.

---

This invention relates to transitional coupling waveguides and more specifically to tapered waveguide couplers for coupling rectangular waveguides which have one waveguide sectional dimension the same but the other different. Usually, though not necessarily, the narrow wall dimensions of the guides to be coupled are different.

Hitherto such tapered waveguide couplers have usually been made by electro-deposition on a former prepared to the required dimensions and shape, or by metal spraying on to such a former or by fabrication from sheet metal. All these methods are costly and require the exercise of much skill and time. The present invention seeks to provide improved, cheaper and simpler methods of making such tapered waveguide couplers.

According to this invention a method of manufacturing a transitional tapered waveguide coupler for coupling two rectangular waveguides which have one cross-sectional dimension the same in both guides but the other different comprises the steps of cutting away two opposite sidewalls of a length of waveguide of the same cross-sectional dimensions as the larger of the two guides to be coupled over that part of the length where the taper is required so as to leave the said side walls unremoved at both ends of said part, slitting the said unremoved side walls at one end of said part with horizontal slits of width substantially equal to the difference between the different cross-sectional dimensions of the two guides to be coupled, pressing together the metal on each side of the said slits to close the same, fixing together the metal edges thus pressed together, and filling in with metal wall plates the resultant tapered side wall spaces left where the side walls were removed. As will be seen, the filling-in plates will be of trapezoidal shape with two opposite edges of different lengths and parallel to one another and the other two opposite edges at equal angles to the first edges. Preferably the edges of the metal at the slits, when closed are hard soldered together and the filling-in plates are fixed by soft soldering.

Figure 1:
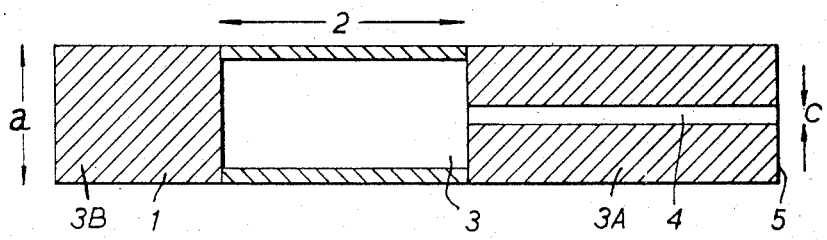
Figure 2:
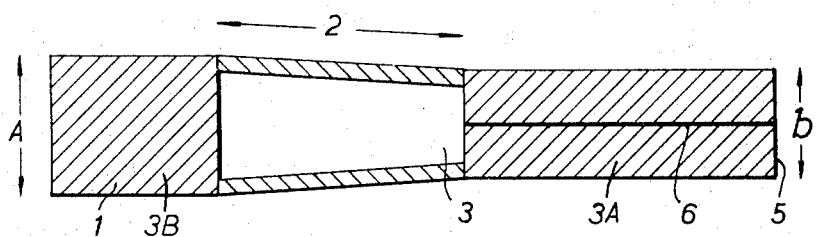
Figure 3:
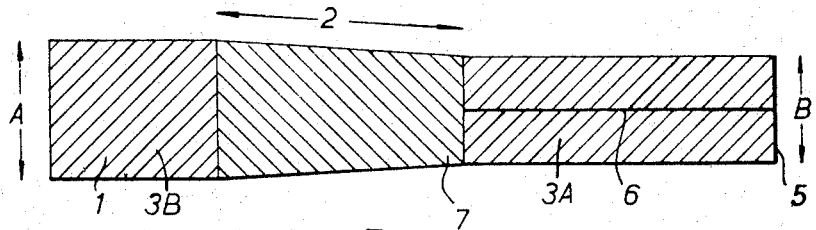

The invention is illustrated in and further described with reference to the accompanying drawings in which FIGURES 1, 2 and 3 are elevations of a transitional waveguide coupling section at different stages in its manufacture in accordance with the present invention.

Referring to the drawing, it is assumed, for the sake of explanation, that a waveguide (not shown) having a narrow wall dimension $a$ is required to be joined to a second waveguide (also not shown) of similar broad wall dimension but of smaller narrow wall dimension $b$ by means of a transitional tapered waveguide coupler. This coupler is made by taking, as the starting material, a length of waveguide 1 of the same cross-sectional dimensions as the larger of the two waveguides to be coupled. The narrow wall on each side is completely cut away over a length 2 to leave openings 3 and unremoved side wall parts 3A and 3B. The length 2 is chosen to correspond to the length over which tapering is required. A longitudinal slit 4 is then cut along the centre of each of the narrow walls 3A at the end 5, to which the smaller of the two waveguides to be coupled is to be fixed. The width $c$ of each slit 4 is equal to the difference between the width of the narrow walls of the waveguides to be coupled, i.e. $a-b$. At this stage in the manufacture the transitional waveguide coupler is as illustrated in FIGURE 1.

The slits 4 are then closed by applying pressure between the broad walls of the waveguide 3 at the end 5 and the meeting edges are soldered together as at 6. Closing the slits 4 causes the broad walls over the length 2 to taper towards one another. At this stage in its manufacture the transitional waveguide coupler is shown in FIGURE 2.

Two similar plates 7, shaped to fit over and close the now tapered openings 3, are then soft soldered in position to complete the coupler, as shown in FIGURE 3.

I claim:
1. A method of manufacturing a transitional tapered waveguide coupler for coupling two rectangular waveguides which have one cross-sectional dimension the same in both guides but the other different comprising the steps of cutting away two opposite sidewalls of a length of waveguide of the same cross-sectional dimensions as the larger of the two guides to be coupled over that part of the length where the taper is required so as to leave the said side walls unremoved at both ends of said part, slitting the said unremoved side walls at one end of said part with horizontal slits of width substantially equal to the difference between the different cross-sectional dimensions of the two guides to be coupled, pressing together the metal on each side of the said slits to close the same, fixing together the metal edges thus pressed together, and filling in with metal wall plates the resultant tapered side wall spaces left where the side walls were removed.

2. A method as claimed in claim 1 wherein the edges of the metal at the slits, when closed are hard soldered together and the filling-in plates are fixed by soft soldering.

References Cited
UNITED STATES PATENTS

| | | | |
|---|---|---|---|
| 2,509,196 | 5/1950 | Cork et al. | 333—34 X |
| 2,791,770 | 5/1957 | Risser | 333—34 X |
| 3,040,277 | 6/1962 | Ohm | 333—34 |
| 3,261,078 | 7/1966 | Hannemann et al. | 29—600 |
| 3,388,352 | 6/1968 | Ramonat | 333—98 |

JOHN F. CAMPBELL, *Primary Examiner.*
D. C. REILEY, *Assistant Examiner.*

U.S. Cl. X.R.
333—98